United States Patent
Coquelet et al.

[11] 3,966,140
[45] June 29, 1976

[54] FISHING REEL

[75] Inventors: Andre Coquelet; Alain Nepote, both of Cluses, France

[73] Assignee: Mitchell S.A., France

[22] Filed: June 30, 1975

[21] Appl. No.: 591,649

[30] Foreign Application Priority Data
July 18, 1974 France .............................. 74.25043

[52] U.S. Cl. ............................................. 242/217
[51] Int. Cl.² ............................................. A01K 89/02
[58] Field of Search ............ 242/217, 218, 219, 99, 242/221

[56] References Cited
UNITED STATES PATENTS

| | | | |
|---|---|---|---|
| 1,296,395 | 3/1919 | Hunt | 242/84.5 R |
| 3,166,269 | 1/1965 | Veroli | 242/217 |
| 3,184,179 | 5/1965 | Wood | 242/217 |
| 3,642,231 | 2/1972 | Fleischer | 242/219 |
| 3,720,386 | 3/1973 | Morner | 242/217 |

*Primary Examiner*—S. Clement Swisher
*Attorney, Agent, or Firm*—Robert E. Burns; Emmanuel Lobato; Bruce L. Adams

[57] ABSTRACT

In a fishing reel, axial displacement of a shaft to modify a drag adjustment is provided by angularly displacing a control member having an integral actuating lever to axially displace an angularly fixed member having a profile cooperating with the control member. Both said control member and the member of complementary profile are secured to the shaft end by a single removable screw member, which is axially but not angularly fixed to the member of complementary profile to enable removal and replacement of the three members as a unit.

2 Claims, 3 Drawing Figures

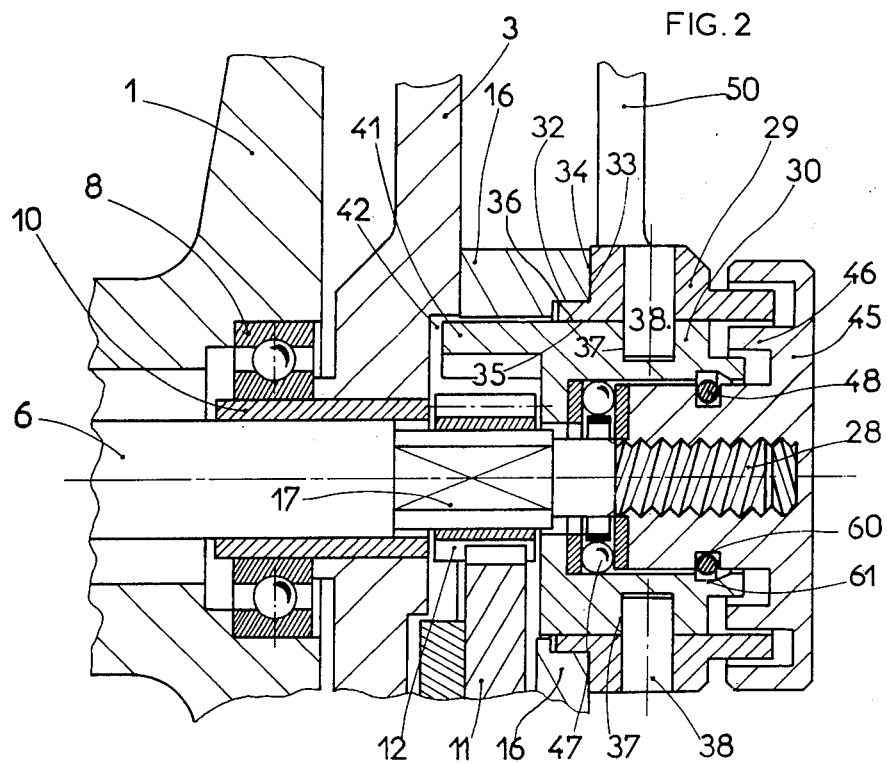
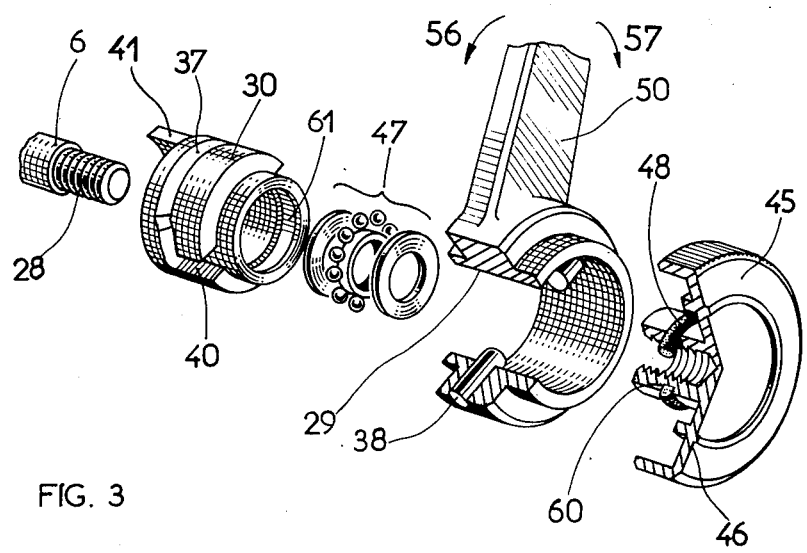

FISHING REEL

The invention concerns fishing reels of the type comprising a rotatable spool disposed between two supports, a spool-braking device disposed coaxial to the spool and being actuable by an intermediate element also coaxial to the spool and movable by an axial traction exerted by a control member which is movable angularly but not axially in relation to the support, this control member including an abutment face disposed facing the outer face of one of the supports and a profiled part cooperating with an element of complementary profile angularly but not axially fixed on the support.

In a known device of this type, described in U.S. Pat. No. 3,432,114 (Meisner), the brake control member is prevented from moving axially by a casing which surrounds it, this casing itself being fixed to one of the flanges serving as supports for the rotary spool. This casing has at its periphery an arcuate slot for passage of the stem of an actuating lever radially screwed in the control member, an actuating handle being elastically mounted on this stem. When it is desired to dismantle the control member, it is necessary after having removed a holding member and the element of complementary profile, to remove the actuating handle to be able to then unscrew the stem of the actuating lever and finally remove the control member from its casing by an axial movement. Such dismantling has the disadvantage of being long and arduous, and cannot be rapidly done during fishing.

An object of the invention is to enable this disadvantage to be avoided, and to provide a reel in which it is possible to easily and rapidly dismantle the brake-adjustment control member and the profiled element cooperating with it, without it being necessary to remove many elements. Such rapid dismantling enables manintenance of the control member and of the profiled element and especially replacement of both or either of these elements when it is necessary to change the range of adjustment of the brake. It is therefore an object of the invention to enable such a change in the range of adjustment to be carried out very rapidly during fishing as a function of the strength of the fishing line used. In practice, the main aim of the angler, using such a reel, is to be able to catch the biggest fish of a given species with a line whose breaking strength is minimum; for this, the characteristics of the brake which serves as torque limiter or drag are primordial.

The reel according to the invention therefore includes a control member and an element of complementary profile which are both retained axially on an end of the intermediate element extending beyond said support, solely by a common removable retaining member disposed on said end. In an advantageous embodiment of the invention, the intermediate element is a rotatably mounted spool shaft, and a ball or roller abutment is interposed between said element of complementary profile and said retaining member which are axially (and only axially) held together by suitable means. The removable and mounting of these elements are hence greatly facilitated since the three elements (i.e. the control member, member of complementary profile and retaining member) can be manipulated as if they formed only a single element.

The accompanying drawings show, by way of example, an embodiment of the fishing reel according to the invention. In the drawings:

FIG. 2 is an enlarged-scale cross-section of a part of this reel including a brake regulating device; and FIG. 3 is an exploded and cut-away perspective view of this brake regulating device.

Figure 1:
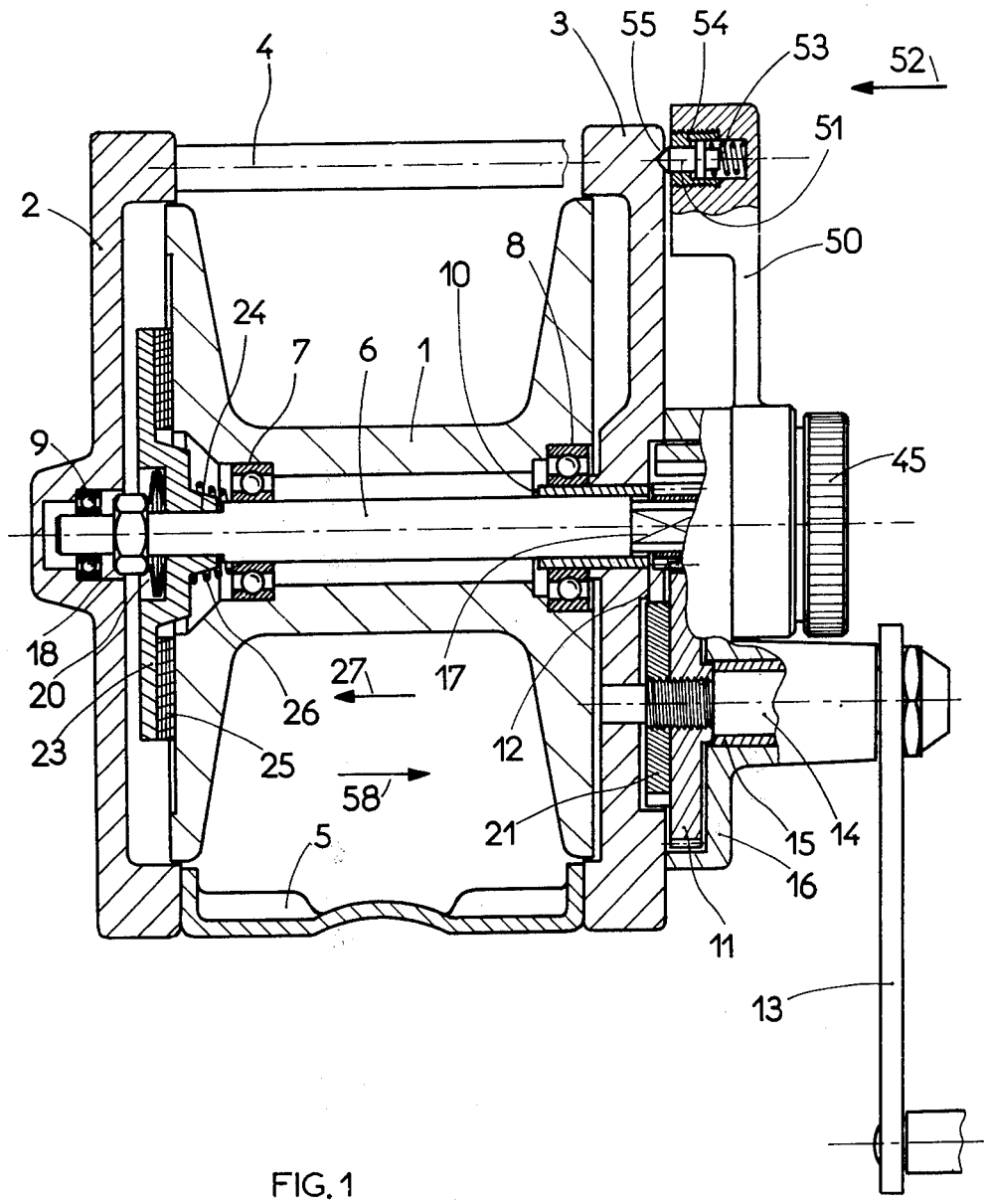
FIG. 1 is a cross-section of a reel according to the invention.

The fishing reel shown in FIG. 1 includes a spool 1 disposed between two flanges 2 and 3 held spaced apart by struts 4; a special strut 5 serves to secure the reel on a fishing line, not shown. Spool 1 is rotatably mounted at one of its ends about a shaft 6 by a ball bearing 7, and at its other end about the external part of a bearing 10 fixed in flange 3, by a ball bearing 8. Shaft 6 is supported in flange 2 by a ball bearing 9 and in flange 3 by bearing 10. A crank 13 is fitted on a shaft 14 able to turn in a bearing 15 fixed in a casing 16 itself fixed to flange 3. In casing 16, the end of shaft 14 opposite crank 13 carries a toothed wheel 11 and a ratchet 21 which are fixed for rotation therewith. Ratchet 21 cooperates with a pawl, not shown, to allow rotation of crank 13 only in one direction, for rewinding line. Toothed wheel 11 is constantly in mesh with a pinion 12 keyed on shaft 6 by flats 17. The other end of shaft 6 carries a stop 18 fixed thereon, this stop being for example formed by a nut screwed on shaft 6. Stop 18 bears, via two resilient washers 20, against a brake disc 23 slidably mounted on shaft 6 but keyed thereon by two flats 24. Facing brake disc 23 is a brake lining 25 fixed on the facing flank of spool 1. A spring 26 constantly biases brake disc 23 in direction 27 to tend to move it away from brake lining 25.

As shown in FIG. 2, the shaft 6 has, following flats 17, a threaded extension 28 protruding out of casing 16 on the same side as crank 13. A control member 29 and a profiled element 30 are disposed coaxially about this extension 28. The control member 29 is held about shaft 6 by an inner cylindrical face 32 of casing 16 in which it is able to turn, and it has an inner abutment face 33 disposed facing the outer face 34 of casing 16. The profiled element 30 is held about shaft 6 by a cylindrical outer part 35 which is housed with a slight play in a inner cylindrical bore 36 of control member 29, in which it can move axially. Element 30 is prevented from moving angularly by a projection 41 fitted with substantially no play in a housing 42 provided in casing 16 and in flange 3. The outer cylindrical part 35 has two diametrically opposed helicoidal grooves 37 in each of which is received an end of a cylindrical stud 38 with a play just sufficient to allow sliding. The other ends of studs 38 are secured in corresponding bores of control member 29. As shown in FIG. 3, each helicoidal groove 37 is extended by a groove 40 parallel to shaft 6 to permit insertion of studs 38 in the helicoidal grooves 37.

The control member 29 and profiled element 30 are held on the end of shaft 6 by a nut 45 having an inner skirt 46 forming a baffle to avoid the penetration of dust or water in helicoidal grooves 37 and in a ball abutment 47 placed between profiled element 30 and nut 45. A retaining member 48, for example a ring of an elastomer, is lodged partially in each of two facing circular grooves 61 and 60 provided respectively in profiled element 30 and in nut 45. This retaining member 48 secures element 30 and nut 45 axially only, and prevents the possible loss of one of these parts during dismantling.

As shown in FIG. 1, control member 29 is extended by an actuating lever 50. The free end of lever 50 has a device serving to angularly position the lever 50 and hence control member 29. This device includes a push stud 51 constantly biased in direction 52 by a spring 53, a sleeve 54 limiting this movement. The end of stud 53 may be lodged in one of several recesses 55 arranged in arcuate configuration on flange 3.

Operation of this reel is as follows: to reduce or cancel the braking or drag action, the angler angularly moves lever 50 in direction 56 (FIG.3), which allows an axial movement of shaft 6 in direction 27 under the action of spring 26, and brake disc 23 moves in the same direction until it completely moves out of engagement against brake lining 25. Spool 1 is hence free to rotate about ball bearings 7 and 8 and the angler can freely reel out the fishing line.

During fishing, the angler acts on lever 50 in direction 57 (FIG. 3); face 33 of control member 29 comes to bear against face 34 of casing 16 by coaction of studs 38 in the helicoidal grooves 37 to move shaft 6 in direction 58 by the intermediary of ball abutment 47 and nut 45. This movement of shaft 6 causes a corresponding movement of brake disc 23 against the action of spring 26 until disc 23 comes into contact with brake lining 25. The brake thus begins to act. By continuing to move lever 50 in direction 57, the two resilient washers 20 become more and more compressed, hence progressively increasing the braking or drag force.

When a fish exerts a traction on the fishing line, spool 1 is thus able to rotate while resisting the fish to a certain degree, as the brake disc 23 is prevented from turning by the one-way device comprising ratchet 21. Also, if the angler turns the crank to wind in line, shaft 6 rotates spool 1 by the intermediary of brake disc 23 which is pressed against brake lining 25, and acting as a clutch drive.

The nut 45, ball abutment 47 and profiled element 30 can be easily dismantled, as well as control member 29, simply by unscrewing nut 45. If the angler desires to change the braking or drag characteristics, it suffices to instantaneously replace these four elements by four other elements, prepared in advance, in which the profiled element 30 has helicoidal grooves 37 of different inclination. The characteristics and range of adjustment of the brake are hence instantaneously modified.

The control member 29 and profiled element 30 may be formed differently; for example, they could include ramps of complementary profile disposed facing one another laterally. The retaining element 48 could be eliminated; and the ball abutment 47 could possibly be arranged differently in other embodiments. Likewise, the intermediate brake-actuating element could be formed by an element distinct from the shaft itself.

The essential feature of the invention resides in that the control member 29 and the profiled element 30 which cooperates therewith to actuate the brake, are axially held on the end of the intermediate element (i.e. shaft 6) by a common easily and rapidly removable element (i.e. nut 45), these elements 29 and 30 being themselves rapidly removable from or fitted on the intermediate element.

The fishing reel according to the invention may be used in all instances where it is desired that during fishing it should be possible to rapidly and easily change the braking or drag characteristics. It is particularly recommended for so-called "multiplying" reels, used for sea fishing.

What is claimed is:

1. In a fishing reel of the type comprising a rotatable spool disposed between two supports, a spool-braking device disposed coaxial to the spool and being actuable by an intermediate element also coaxial to the spool and movable by an axial traction exerted by a control member which is movable angularly but not axially, this control member including an abutment face disposed facing the outer face of one of the supports and at least one profiled part cooperating with a member of complementary profile angularly but not axially fixed on said support, the improvement wherein said control member and said member of complementary profile are retained axially on an end of the intermediate element extending beyond said one support solely by a common removable retaining member disposed on said end.

2. A fishing reel according to claim 1, in which said intermediate element is a rotatably mounted spool shaft, and comprising a ball or roller abutment interposed between said member of complementary profile and said retaining member, and means for joining said member of complementary profile axially to said retaining member while allowing relative rotation of said members.

* * * * *